(12) United States Patent
Loncke

(10) Patent No.: US 8,346,836 B2
(45) Date of Patent: Jan. 1, 2013

(54) APPARATUS AND METHOD FOR AREA AND SPEED EFFICIENT FAST FOURIER TRANSFORM (FFT) PROCESSORING WITH RUNTIME AND STATIC PROGRAMMABILITY OF NUMBER OF POINTS

(75) Inventor: Vincent Loncke, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 950 days.

(21) Appl. No.: 12/413,511

(22) Filed: Mar. 27, 2009

(65) Prior Publication Data

US 2009/0248775 A1    Oct. 1, 2009

Related U.S. Application Data

(60) Provisional application No. 61/041,214, filed on Mar. 31, 2008.

(51) Int. Cl.
*G06F 15/00*    (2006.01)
(52) U.S. Cl. ......... 708/403; 708/404; 708/405; 708/408
(58) Field of Classification Search ............... 708/1–845
See application file for complete search history.

(56) References Cited

U.S. PATENT DOCUMENTS

| 6,073,154 | A | * | 6/2000 | Dick | 708/401 |
| 2005/0289207 | A1 | * | 12/2005 | Lee et al. | 708/404 |
| 2006/0010188 | A1 | | 1/2006 | Solomon et al. | |

OTHER PUBLICATIONS

International Search Report and Written Opinion—PCT/US2009/038844, International Search Authority—European Patent Office—Sep. 7, 2010.
Lee C-Y et al: "A I-GS/s FFT/IFFT Processor for UWB Applications" IEEE Journal of Solid-State Circuits, vol. 40, No. 8, Aug. 2005, pp. 1726-1735, XP011136758 ISSN: 0018-9200 * section IV.A; figures 4-9 *.
Shousheng He et al: "Designing pipeline FFT processor for OFDM (de)modulation"Signals! Systems, and Electronics, 1998. ISSSE 98. 1998 URSI Internati Onal Symposium on Pisa, Italy Sep. 29-Oct. 2, 1998, New York, NY, USAJEEE, US LNKD—DOI:10.1109/ISSSE. 199.

* cited by examiner

*Primary Examiner* — Isaac M Woo
(74) *Attorney, Agent, or Firm* — Stanton Braden

(57) ABSTRACT

An apparatus and method for area and speed efficient fast Fourier transform (FFT) processing comprising mapping a one-dimensional DFT to a multi-dimensional representation; re-indexing the multi-dimensional representation as a radix $2^3$ decimation architecture; simplifying the radix $2^3$ decimation architecture to obtain a nested butterfly architecture; acquiring N samples of a finite duration time-sampled signal; and inputting the acquired N samples into the nested butterfly architecture to obtain a N-point fast Fourier transform (FFT) output.

50 Claims, 7 Drawing Sheets

APPARATUS AND METHOD FOR AREA AND SPEED EFFICIENT FAST FOURIER TRANSFORM (FFT) PROCESSORING WITH RUNTIME AND STATIC PROGRAMMABILITY OF NUMBER OF POINTS

CLAIM OF PRIORITY UNDER 35 U.S.C. §119

The present Application for Patent claims priority to Provisional Application No. 61/041,214 entitled "Area and speed efficient FFT Processor with Runtime andSstatic Programmability of Number of Points" filed Mar. 31, 2008, and assigned to the assignee hereof and hereby expressly incorporated by reference herein.

FIELD

This disclosure relates generally to apparatus and methods for fast Fourier transform (FFT) processing. More particularly, the disclosure relates to area and speed efficient fast Fourier transform (FFT) processing.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Disclosed is an apparatus and method for area and speed efficient fast Fourier transform (FFT) processing. According to one aspect, a method for area and speed efficient fast Fourier transform (FFT) processing comprising mapping a one-dimensional discrete Fourier transform (DFT) to a multi-dimensional representation; re-indexing the multi-dimensional representation as a radix $2^3$ decimation architecture; simplifying the radix $2^3$ decimation architecture to obtain a nested butterfly architecture; acquiring N samples of a finite duration time-sampled signal; and inputting the acquired N samples into the nested butterfly architecture to obtain a N-point fast Fourier transform (FFT) output.

According to another aspect, a fast Fourier transform (FFT) processor for area and speed efficient FFT processing comprising a processing unit for a) mapping a one-dimensional discrete Fourier transform (DFT) to a multi-dimensional representation, b) re-indexing the multi-dimensional representation as a radix $2^3$ decimation architecture, and c) simplifying the radix $2^3$ decimation architecture; an analog-to-digital converter for acquiring N samples of a finite duration time-sampled signal; and a nested butterfly architecture derived from the simplified radix $2^3$ decimation architecture, the nested butterfly architecture for converting the acquired N samples to a N-point fast Fourier transform (FFT) output.

According to another aspect, an apparatus for area and speed efficient fast Fourier transform (FFT) processing comprising means for mapping a one-dimensional discrete Fourier transform (DFT) to a multi-dimensional representation; means for re-indexing the multi-dimensional representation as a radix $2^3$ decimation architecture; means for simplifying the radix $2^3$ decimation architecture to obtain a nested butterfly architecture; means for acquiring N samples of a finite duration time-sampled signal; and means for inputting the acquired N samples into the nested butterfly architecture to obtain a N-point fast Fourier transform (FFT) output.

According to another aspect, a computer-readable medium having a computer program comprising instructions, which when executed by at least one processor, operates to, the computer program comprising instructions for mapping a one-dimensional discrete Fourier transform (DFT) to a multi-dimensional representation; instructions for re-indexing the multi-dimensional representation as a radix $2^3$ decimation architecture; instructions for simplifying the radix $2^3$ decimation architecture to obtain a nested butterfly architecture; instructions for acquiring N samples of a finite duration time-sampled signal; and instructions for inputting the acquired N samples into the nested butterfly architecture to obtain a N-point fast Fourier transform (FFT) output.

Advantages of the present disclosure include an area and speed efficient fast Fourier transform (FFT) processing with runtime and static programmability of number of points.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
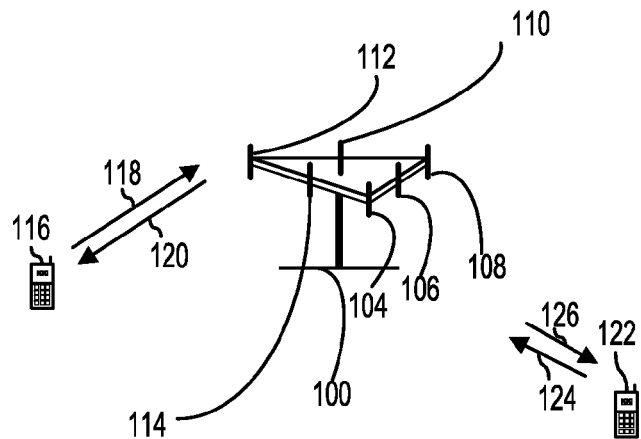
FIG. 1 illustrates an example of a multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. Additionally, one skilled in the art would understand that many examples of radio access technologies employed by various wireless systems, including but not limited to, UMTS, WCDMA, GSM, GSM/GPRS/EDGE, LTE, IS-95, CDMA2000, EVDO or UMB, etc. are applicable to the present disclosure.

Single carrier frequency division multiple access (SC-FDMA), which utilizes single carrier modulation and frequency domain equalization, is a multiple access technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an example of a multiple access wireless communication system. As illustrated in FIG. 1, an access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. For example in a frequency division duplex (FDD) system, communication links 118, 120, 124 and 126 use different frequency for communication with the forward link 120 using a different frequency then that used by reverse link 118.

Each group of antennas and/or the area in which they are designed to communicate is often referred to as a sector of the access point. In one aspect, each antenna groups is designed to communicate to access terminals in a particular sector of the areas covered by access point 100.

In communication over forward links 120 and 126, the transmitting antennas of access point 100 utilize beamforming in order to improve the signal-to-noise ratio (SNR) of forward links for the different access terminals 116 and 124. Also, an access point using beamforming to transmit to access terminals scattered randomly through its coverage causes less interference to access terminals in neighboring cells than an access point transmitting through a single antenna to all its access terminals.

One skilled in the art would understand that although the term access point is used, other equivalent terminology may be used in its place without affecting the spirit or scope of the present disclosure. For example, an access point may be a fixed station used for communicating with the access terminals and may be referred to as a base station, a fixed station, a node or some other similar terminology. Similarly, the term access terminal can equally refer to a mobile terminal, a handheld, user equipment (UE), a wireless communication device, terminal or another similar term without affecting the spirit or scope of the present disclosure.

Figure 2:
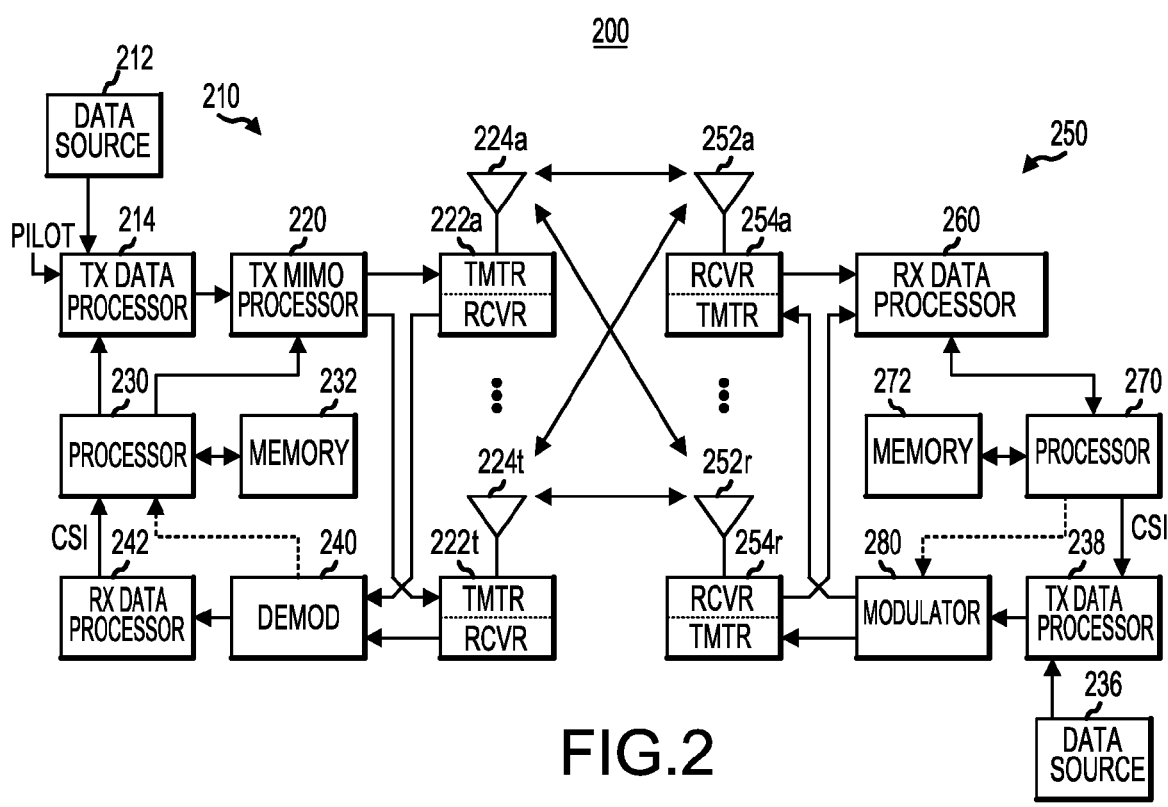
FIG. 2 illustrates an example block diagram of a transmitter system (a.k.a. access point) and a receiver system (a.k.a. access terminal) in a MIMO system.

FIG. 2 illustrates an example block diagram of a transmitter system 210 (a.k.a. access point) and a receiver system 250 (a.k.a. access terminal) in a MIMO system 200. At the transmitter system 210, traffic data for a number of data streams is provided from a data source 212 to a transmit (TX) data processor 214. In one aspect, each data stream is transmitted over a respective transmit antenna. TX data processor 214 formats, codes, and interleaves the traffic data for each data stream based on a particular coding scheme selected for that data stream to provide coded data.

In one aspect, the coded data for each data stream is multiplexed with pilot data using orthogonal frequency division multiplex (OFDM) techniques. The pilot data is typically a known data pattern that is processed in a known manner and is used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are determined by instructions performed by processor 230.

The modulation symbols for all data streams are then provided to a TX MIMO processor 220, which further process the modulation symbols (e.g., for OFDM). TX MIMO processor 220 then provides $N_T$ modulation symbol streams to $N_T$ transmitters (TMTR) 222a through 222t. In an example, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

The Fourier transform is a generic signal processing tool to transform functions from one domain into another domain. In one-dimensional systems, the first domain may be the time domain and the second domain may be the frequency domain. In many cases, a function of time is often more conveniently analyzed or processed in the frequency domain. Hence, a Fourier transformation of a time domain function may be performed to obtain a frequency domain function before subsequent signal processing occurs. In one example, a time domain function is known as a signal. In one example, a frequency domain function obtained from the Fourier transformation of a time domain function is known as a transform.

In a theoretical mathematical development, a signal may have an infinite duration and may be specified continuously over time. In this case, the Fourier transformation of a continuous signal results in a continuous transform. However, in practical engineering systems, a signal never has infinite duration and is not measured continuously, that is, the signal has finite duration and is sampled in time at a certain sampling rate. As a consequence, the Fourier transformation of a finite duration time-sampled signal results in a discrete Fourier transform (DFT).

In one example, a DFT is computed as a complex weighted sum of a time-sampled signal over the time sample index n, as a function of discrete frequency index k. The time sample index n has a finite duration (a.k.a. the number of samples) of N and the discrete frequency index k also has an extent of N values. Conversely, the time-sampled signal may be recovered from the DFT samples by using an inverse DFT (IDFT). In one example, both the DFT and IDFT may be computed efficiently using Fast Fourier Transform (FFT) and Inverse Fast Fourier Transform (IFFT) algorithms, respectively, in a FFT processor and IFFT processor. In one example, a FFT processor or IFFT processor is used as the implementation for an OFDM modulator in the transmitter or for an OFDM demodulator in the receiver.

In one aspect, the FFT processor is a general purpose FFT engine with support for static and run-time programmability of N samples (where N is a finite duration of the FFT, a.k.a. the number of samples) and run-time programmability of FFT/IFFT. Autoscaling and output scaling are supported as well. The FFT processor supports exclusively power of 2 point configurations ( . . . , 128, 256, 512, . . . ). Static programmability is configured by a MAX_N constant set in the source code. This feature along with an input data width constant (I_W) statically scales the FFT engine to support the desired settings. Run-time programmability of N occurs through one port, which is configured with the invocation of the FFT. Run-time FFT/IFFT programmability occurs through the port mode, which is configured with the invocation of the FFT.

In one example, the amount of computation required to perform a DFT or IDFT of length N is $O(N^2)$, wherein the DFT is expressed by equation (1) and the IDFT is expressed by equation (2).

$$X[k] = \sum_{n=0}^{N-1} x[n]W_N^{kn}, k = 0, 1, \ldots, N-1, \quad (1)$$

where $W_N = e^{-j(2\pi/N)}$ $$x[n] = \frac{1}{N}\sum_{k=0}^{N-1} X[k]W_N^{-kn}, n = 0, 1, \ldots, N-1, \quad (2)$$

To dramatically reduce the amount of operations, FFT algorithms exploit the periodicity and symmetry of the complex exponential $W_N = e^{-j(2\pi/N)}$ by decomposing the DFT into a combination of smaller DFT's. These algorithms can reduce the computational complexity to $O(N \log(N))$. One approach to designing FFT algorithms is to use a multidimensional index map for the indices n and k. Consider $N=N_1 N_2$ and map the one dimensional DFT to a multidimensional representation by replacing k and n with linear index mappings $$n = K_1 n_1 + K_2 n_2, \quad \{0 \le n_1 \le N_1 - 1, \quad (3)$$
$$\{0 \le n_2 \le N_2 - 1,$$

$$k = K_3 k_1 + K_4 k_2, \quad \{0 \le k_1 \le N_1 - 1, \quad (4)$$
$$\{0 \le k_2 \le N_2 - 1,$$

This gives $$X[K_3 k_1 + K_4 k_2] = \sum_{n_1=0}^{N_1-1}\sum_{n_2=0}^{N_2-1} x[K_1 n_1 + K_2 n_2]W_N^{(K_1 n_1 + K_2 n_2)(K_3 k_1 + K_4 k_2)} \quad (5)$$

Expanding the complex exponential gives $$W_N^{(K_1 n_1 + K_2 n_2)(K_3 k_1 + K_4 k_2)} = W_N^{K_2 K_4 n_2 k_2} W_N^{K_1 K_4 n_1 k_2} W_N^{K_1 K_3 n_1 k_1} W_N^{K_2 K_3 n_2 k_1}, \quad (6)$$

By choosing $N_1$, $N_2$, $K_1$, $K_2$, $K_3$ and $K_4$, equation (5) can be evaluated as nested DFT's and factors in equation (6) can be made trivial (1, -j, etc.). The index mapping approach can be extended to dimensions greater than two.

In one example, the FFT processor is implemented using a Radix $2^3$ Decimation in Frequency (DIF) architecture. Define the linear index mappings as $$n = \frac{N}{2}n_1 + \frac{N}{4}n_2 + \frac{N}{8}n_3 + n_4, \quad \begin{cases}0 \le n_1 \le 1, \\ 0 \le n_2 \le 1, \\ 0 \le n_3 \le 1, \\ 0 \le n_4 \le \frac{N}{8} - 1,\end{cases} \quad (7)$$

$$k = k_1 + 2k_2 + 4k_3 + 8k_4, \quad \begin{cases}0 \le k_1 \le 1, \\ 0 \le k_2 \le 1, \\ 0 \le k_3 \le 1, \\ 0 \le k_4 \le \frac{N}{8} - 1,\end{cases} \quad (8)$$

With this 4-dimensional index map the one dimensional DFT takes the form $$X[k_1 + 2k_2 + 4k_3 + 8k_4] = \quad (9)$$
$$\sum_{n_4=0}^{\frac{N}{8}-1}\sum_{n_3=0}^{1}\sum_{n_2=0}^{1}\sum_{n_1=0}^{1} x\left[\frac{N}{2}n_1 + \frac{N}{4}n_2 + \frac{N}{8}n_3 + n_4\right]$$
$$W_N^{(\frac{N}{2}n_1 + \frac{N}{4}n_2 + \frac{N}{8}n_3 + n_4)(k_1 + 2k_2 + 4k_3 + 8k_4)}$$

One skilled in the art would understand that although the example is expressed as a Decimation in Frequency (DIF) architecture, that other architecture, such as a Decimation in Time (DIT) architecture, may be used and the expressed equations changed accordingly without affecting the spirit and scope of the present disclosure.

Expanding the complex exponential, combining like terms and using $$W_N^{\frac{N}{2}kn} = (-1)^{kn} \text{ and } W_N^{\frac{N}{4}kn} = (-j)^{kn},$$

the complex exponential becomes as expressed in equation (10).

$$W_N^{kn} = (-1)^{k_1 n_1}(-j)^{n_2(k_1+2k_2)}W_N^{\frac{N}{8}n_3(k_1+2k_2+4k_3)}W_N^{n_4(k_1+2k_2+4k_3)}W_N^{8n_4 k_4} \quad (10)$$

Plugging equation (10) into equation (9) and simplifying, the resulting equation (9) becomes as expressed in equation (11).

$$X[k_1 + 2k_2 + 4k_3 + 8k_4] = \quad (11)$$
$$\sum_{n_4=0}^{\frac{N}{8}-1}\left[b_3(n_4, k_1, k_2, k_3)W_N^{n_4(k_1+2k_2+4k_3)}\right]W_N^{8n_4 k_4}$$

where $$b_3(n_4, k_1, k_2, k_3) = \quad (12)$$
$$b_2(n_4, k_1, k_2) + W_N^{\frac{N}{8}(k_1+2k_2+4k_3)}b_2\left(n_4 + \frac{N}{8}, k_1, k_2\right),$$

$$b_2(n, k_1, k_2) = b_1(n, k_1) + (-j)^{(k_1+2k_2)}b_1\left(n + \frac{N}{4}, k_1\right), \quad (13)$$

and $$b_1(n, k_1) = x(n) + (-1)^{k_1} x\left(n + \frac{N}{2}\right) \quad (14)$$

Equation (11) represents the DFT as a series of nested butterflies. Each stage of nesting extracts a trivial component of the complex exponential of equation (10), leaving the relatively non-trivial portion for the last stage. For example, equation (14) contains $(-1)^{k_1}$, which is an adder/subtractor, equation (13) contains $(-j)^{(k_1+2k_2)}$ which is a real/imaginary swap and sign inversion, and equation (12) contains $$W_N^{\frac{N}{8}(k_1+2k_2+4k_3)}$$

which can be factored as follows:

$$W_N^{\frac{N}{8}(k_1+2k_2+4k_3)} = W_N^{\frac{N}{8}k_1} W_N^{\frac{N}{4}(k_2+2k_3)} = \left(\frac{\sqrt{2}}{2}(1-j)\right)^{k_1} (-j)^{(k_2+2k_3)} \quad (15)$$

This component of the complex exponential is a combination of real/imaginary swap, add/subtract and multiplication by a constant real number $$\left(\frac{\sqrt{2}}{2}\right).$$

This multiplier is less complex since it doesn't require booth recoding logic.

Figure 3A:
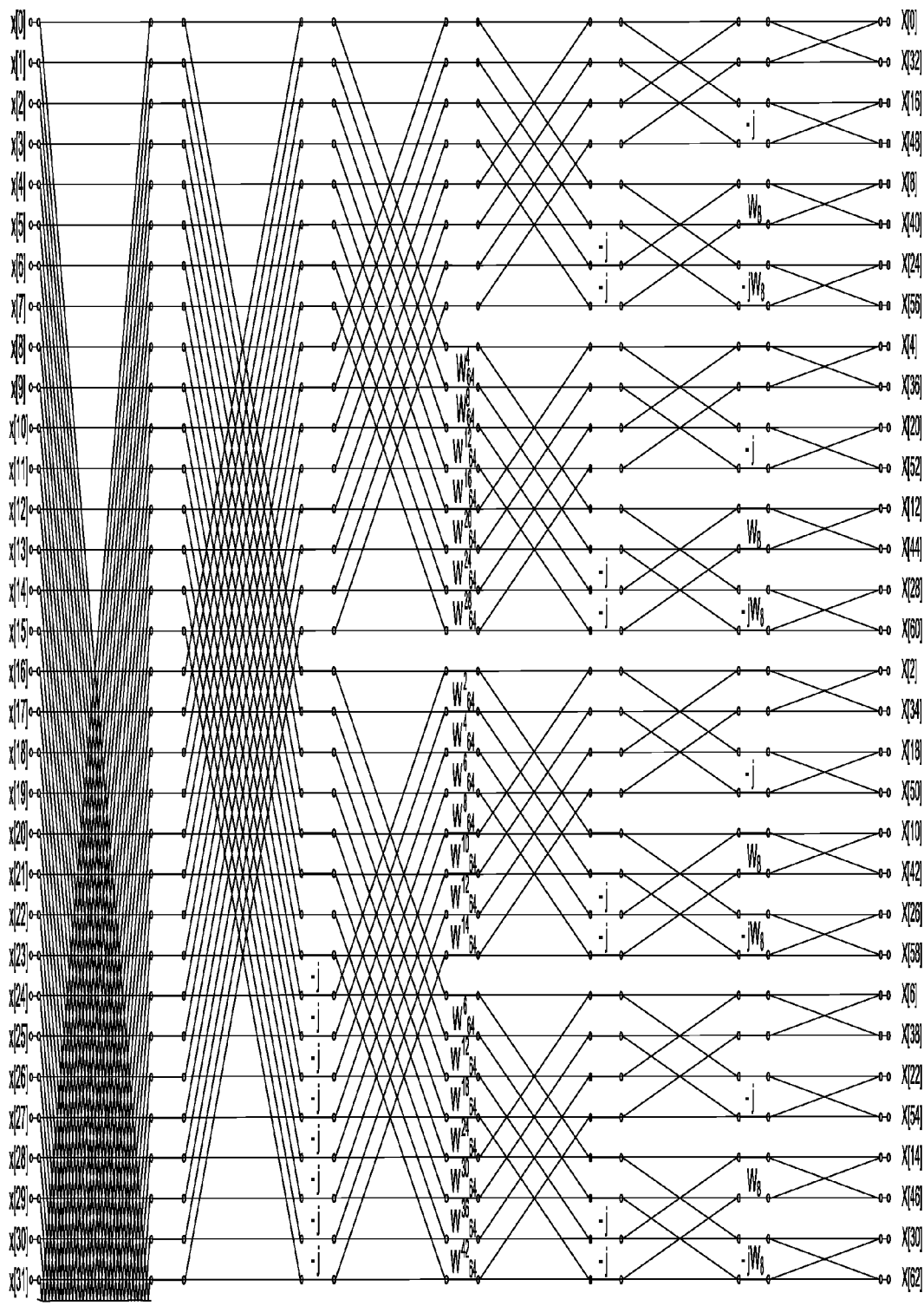
FIGS. 3*a* and 3*b* illustrate an example diagram of an N=64 FFT architected using the Radix $2^3$ Decimation in Frequency (DIF) architecture.
Figure 3B:
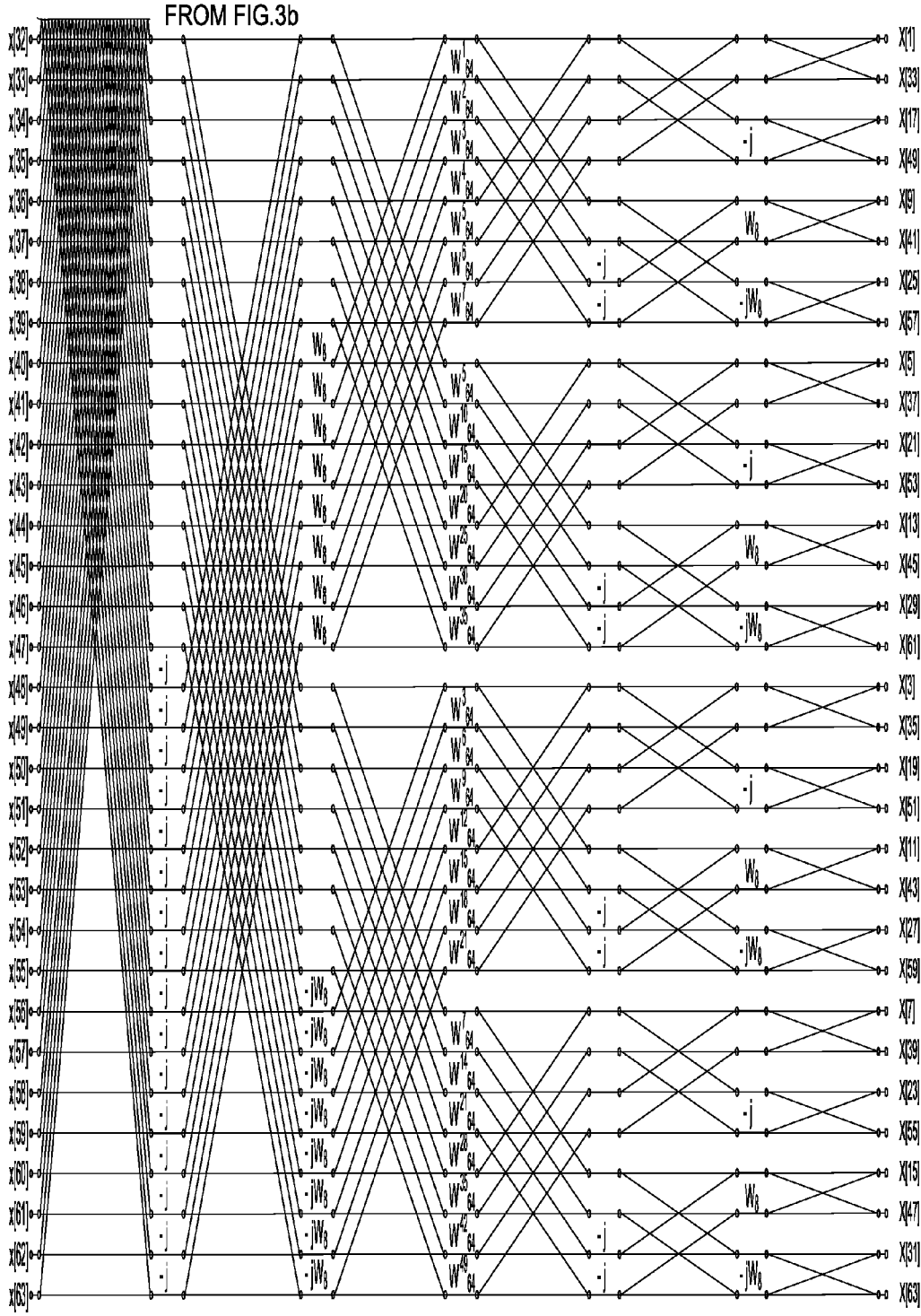

FIGS. 3a and 3b illustrate an example diagram of an N=64 FFT architected using the Radix $2^3$ Decimation in Frequency (DIF) architecture. As illustrated in FIGS. 3a and 3b, multiplying by a complex twiddle is done every $3^{rd}$ stage. Trivial computations (add/subtract, real/imaginary swap, multiply by real constant) are done in the other stages. Due to this, the $2^3$ factorization lends itself to an architecture that processes 3 stages recursively with twiddle complex multiplications done at the output of every $3^{rd}$ stage.

Thus, as illustrated in FIGS. 3a and 3b, the structure of the FFT in the last 3 stages is exactly the same as the structure in the $1^{st}$ 3 stages except operating on N/8=8 points and replicated 8 times. Thus an architecture that can process the first 3 stages needs the ability to scale every $3^{rd}$ stage to perform the same processing but on less points and in a replicated fashion. Additionally, FIGS. 3a and 3b illustrate that from the 1st stage butterflies, the adder takes as input sample $x_i$ and $$x_{i+\frac{N}{2}}.$$

If samples are processed serially, the FFT requires storage for the $1^{st}$ N/2 samples before the add/subtract in the butterflies can begin. Similarly the $2^{nd}$ stage requires storage for N/4 samples and the $3^{rd}$ stage requires storage for N/8 samples. These storage requirements scale and are replicated as discussed previously after the first 3 stages.

Figure 4:
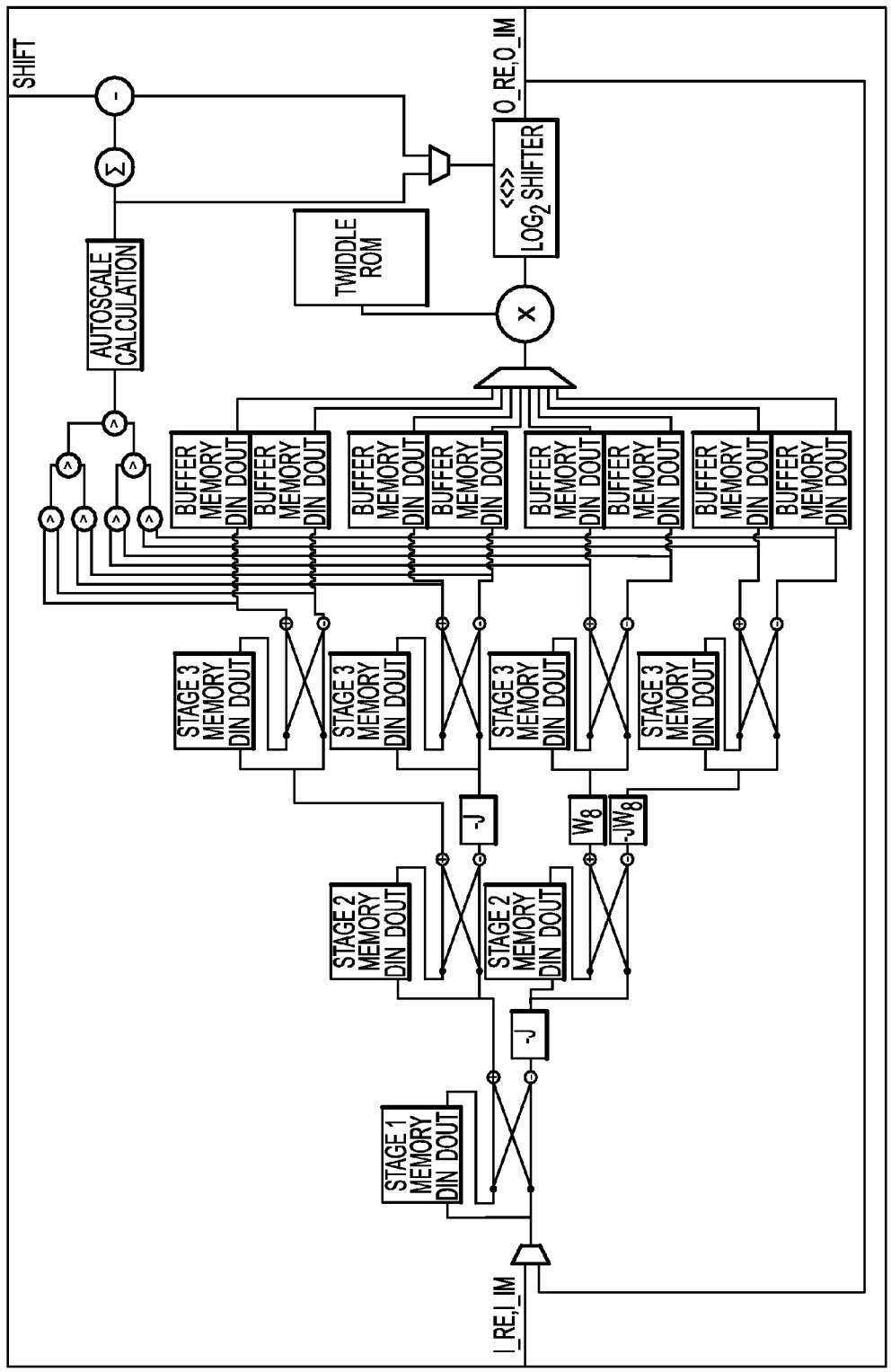
FIG. 4 illustrates an example block diagram of a fast Fourier transform (FFT) processor including a butterfly structure.

FIG. 4 illustrates an example block diagram of a fast Fourier transform (FFT) processor including a butterfly structure. The architecture illustrated in FIG. 4 processes the N point FFT 3 stages at a time. The total number of cycles per FFT job is –ceiling (log$_2$(N)/3)*N cycles plus negligible overhead for large N($\geq$128). Buffer memories are implemented as 8 banks on the write side. This is so samples from the 8 butterfly taps in the $3^{rd}$ stage can be written simultaneously. The 8 butterfly taps in the $3^{rd}$ stage also feed a comparator tree used to monitor overflow and calculate the appropriate autoscaling shift-right value which is fed to the autoscaling shifter. The 8 banks of buffer memory are multiplexed on the read side for samples to be read serially. Twiddle and autoscaling shift is done at the output of the buffer memories (input to $3^{rd}$+1 stage). The Twiddle ROM is implemented as a quarter sine wave. Through manipulation of address and sign inversion at the output of the Twiddle ROM the entire sine and cosine period is produced.

In one example, the autoscaling shifter is implemented as a log$_2$ shifter and takes as input 2 shift values. During intermediate processing the autoscaling shifter uses a shift right value provided by the overflow comparator tree. After completion and when samples are being written out of the processor the shifter uses an output shift value supplied from the interface minus an accumulated autoscaling shift. This accumulated value is the sum of all autoscaling shifts applied during the FFT job. Applying this composite shift at the output has the effect of undoing the total autoscaling for that job. Samples that exceed the output precision are saturated during this process. This undoing of autoscaling allows the FFT processor to maintain consistent gain job to job.

The FFT processor VHSIC Hardware Description Language (VHDL) source code is fully parameterizable. VHSIC stands for the acronym "very high speed integrated circuits." All signal widths, and array sizes are determined by constants that may be statically derived from certain core constants. The core constants are MAX_N which determines the maximum FFT size and I_W which determines the input sample bit size. The FFT datapath and control structure scales to support these constants. Table 1 summarizes the interface characteristics for the FFT processor.

TABLE 1

| SIGNAL | DIRECTION | POLARITY | DESCRIPTION |
|---|---|---|---|
| clk | input | | |
| reset | input | Active high | |
| N | input | | Number of points. Power of 2 up to MAX_N |
| mode | input | | 0 - FFT<br>1 - IFFT |
| scale | input | | Output shift-signed<br>>0 shift left,<br><0 shift right |
| start | input | Active high | 1 clock wide start pulse |
| rdy | output | Active high | 1 - ready for input<br>0 - busy |
| done | output | Active high | 1 clock wide done pulse |
| i_we | input | Active high | Input sample write strobe |
| i_re, i_im | input | | real/imaginary input samples |
| o_we | output | Active high | Output write stobe |
| o_re, o_im | output | | real/imaginary output samples |

FFT processor has interface timing and is invoked with a 1 clock wide start pulse. Controls should be valid with the assertion of the start pulse. Samples can be written to the FFT processor serially on the clock cycle after the start pulse. The samples are qualified with the i_we signal. The FFT processor's pipeline stalls on the deassertion (i.e., set to zero) of i_we, thus supporting burstiness on input write. After the FFT job is complete the done signal is asserted for 1 clock, after which the o_we signal is asserted by the FFT and the output samples are burst written to the interface. A subsequent FFT job can be started after the done signal and run concurrently with the previous jobs output burst with the limitation that the subsequent job is configured for greater than or equal N from the previous. A subsequent job with N less than the previous job, run concurrently with the burst phase of the previous job, will conflict and cause sample corruption.

In one aspect, the example FFT processor architecture is fully pipelined to support high speeds. Multipliers are pipelined as well as inputs and outputs of memories. In one example, the FFT processor architecture is synthesized to 500 MHz clock speed in 65 nm chip technology with conservative wireload model in segmented mode.

Figure 5:
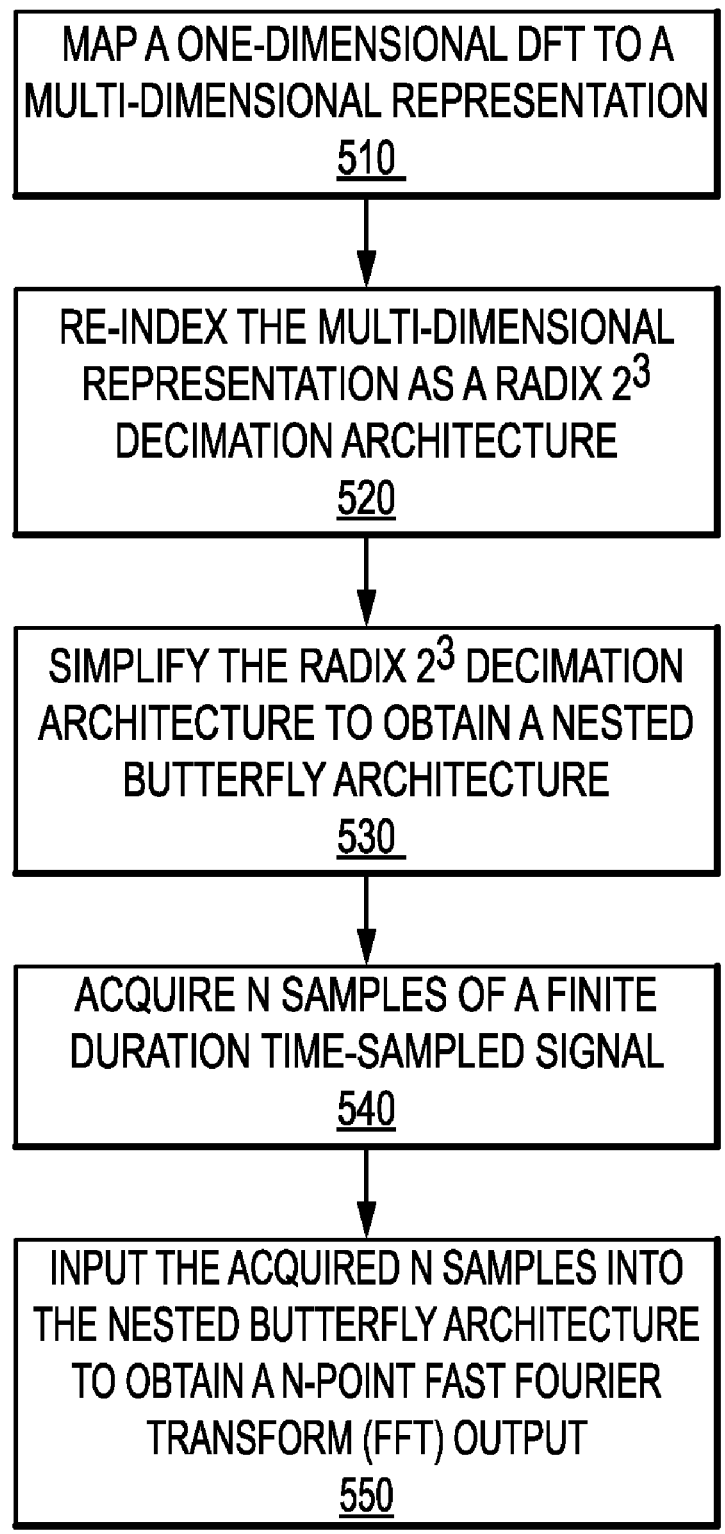
FIG. 5 illustrates an example flow diagram for area and speed efficient fast Fourier transform (FFT) processing in accordance with the present disclosure.

FIG. 5 illustrates an example flow diagram for area and speed efficient fast Fourier transform (FFT) processing in accordance with the present disclosure. In block 510, map a one-dimensional DFT to a multi-dimensional representation using equations (5) and (6). In one example, the multi-dimensional representation has four dimensions. Following block 510, in block 520, re-index the multi-dimensional representation as a radix $2^3$ decimation architecture using equations (7) and (8). In one example the radix $2^3$ decimation architecture is a decimation in frequency (DIF) architecture. In another example, the decimation architecture is a decimation in time (DIT) architecture. In one aspect, the radix $2^3$ decimation architecture is implemented by a 3 fast Fourier transform (FFT) stages wherein the 3 fast Fourier transform (FFT) stages are recursively processed.

Following block 520, in block 530, simplify the radix $2^3$ decimation architecture to obtain a nested butterfly architecture as expressed mathematically by equation (11). In one example, the nested butterfly architecture is implemented by a 3 fast Fourier transform (FFT) stages and comprises an autoscaling shifter to autoscale the third stage of the 3 fast Fourier transform (FFT) stages. The autoscaling shifter may be implemented as a $\log_2$ shifter. In one aspect, the nested butterfly architecture comprises at least one buffer memory which is implemented as 8 banks on the write side. The nested butterfly architecture may further comprise a twiddle shift for shifting an output of the buffer memory. And, the twiddle shift may be implemented as a quarter sine wave.

In block 540, acquire N samples of a finite duration time-sampled signal as expressed mathematically in equation (1). In one example, an analog-to-digital (A/D) converter is used to acquire the N samples. In one example, the N samples are weighted by a window function, such as but not limited to, a Kaiser window, a Hamming window, a Blackman-Tukey window, a Hanning window, a Cosine window, a Lanczos window, a Bartlett window, a Gauss window, a Bessel window, or a Nuttal window, etc. Following block 540, in block 550, input the acquired N samples into the nested butterfly architecture to obtain a N-point fast Fourier transform (FFT) output.

One skilled in the art would understand that the steps disclosed in the example flow diagram in FIG. 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
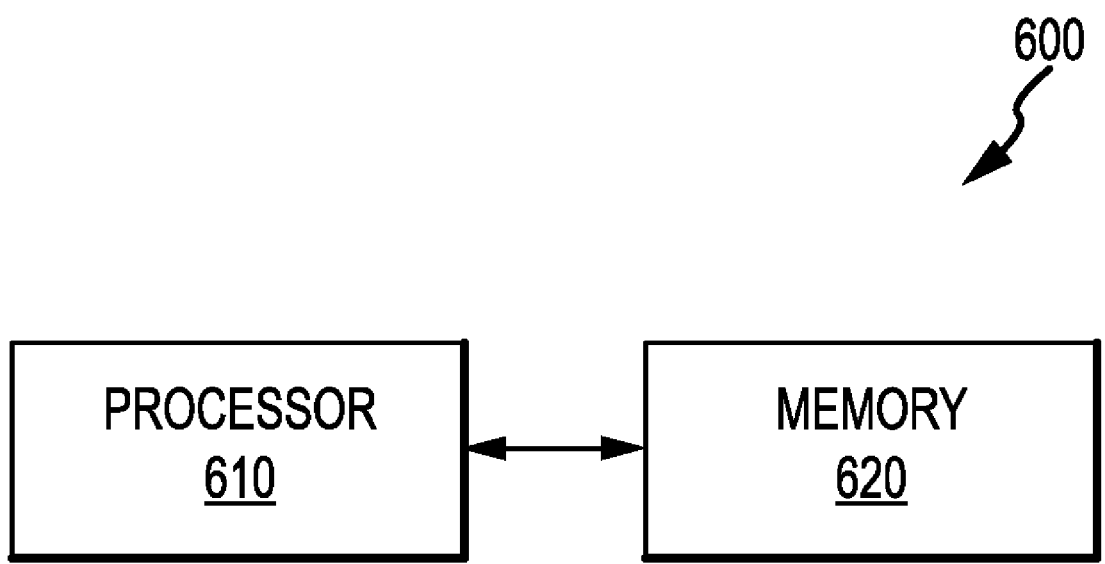
FIG. 6 illustrates an example of a device comprising a processor in communication with a memory for executing the processes for area and speed efficient fast Fourier transform (FFT) processing.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes for area and speed efficient fast Fourier transform (FFT) processing. In one example, the device 600 is used to implement the algorithm illustrated in FIG. 5. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
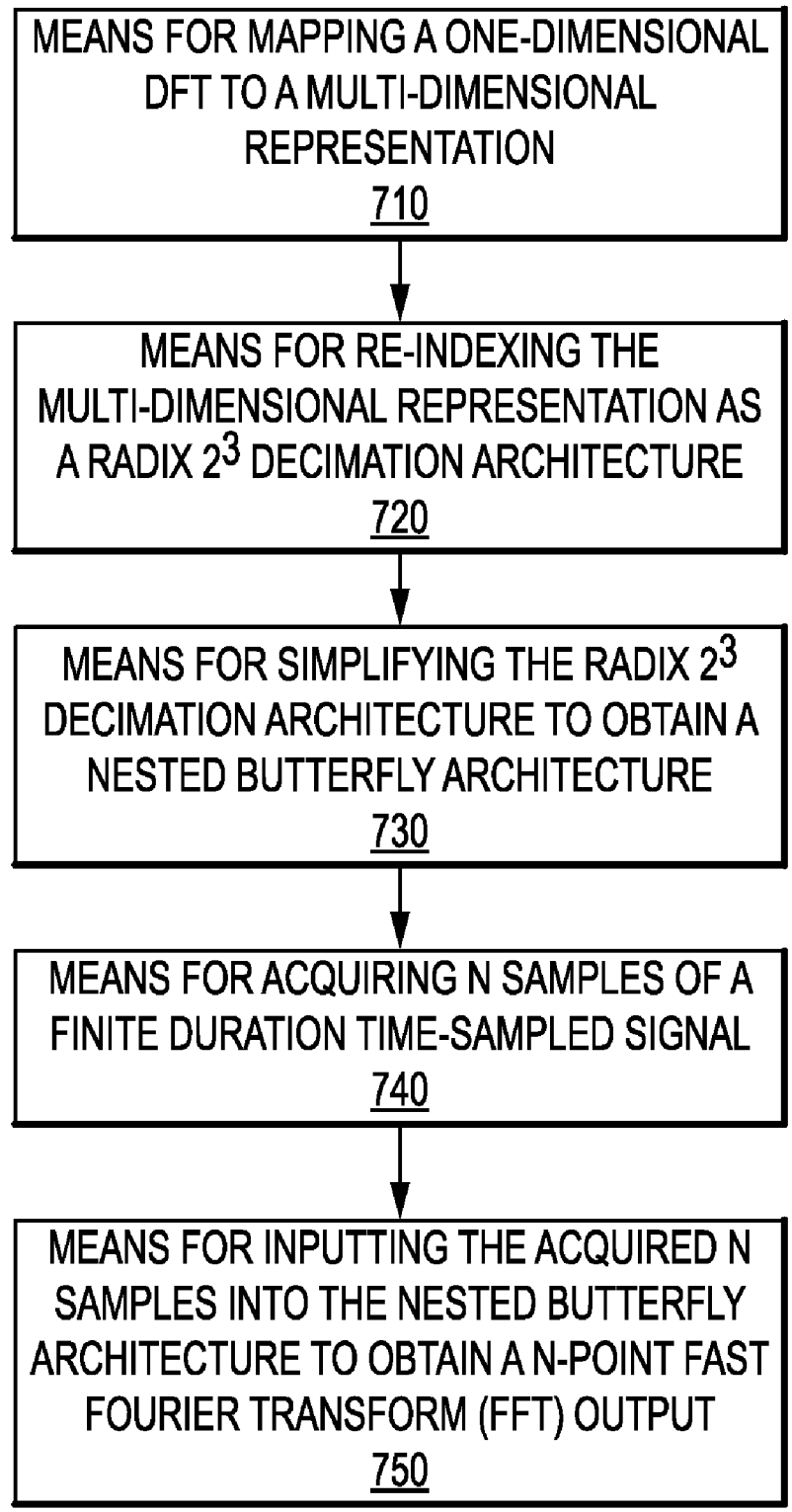
FIG. 7 illustrates an example of a device 700 suitable for area and speed efficient fast Fourier transform (FFT) processing.

FIG. 7 illustrates an example of a device 700 suitable for area and speed efficient fast Fourier transform (FFT) processing. In one aspect, the device 700 is implemented by at least one processor comprising one or more modules configured to provide different aspects of area and speed efficient fast Fourier transform (FFT) processing as described herein in blocks 710, 720, 730, 740 and 750. For example, each module comprises hardware, software, firmware, or any combination thereof. In one aspect, the device 700 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for area and speed efficient fast Fourier transform (FFT) processing comprising:
    mapping a one-dimensional discrete Fourier transform (DFT) to a multi-dimensional representation;
    re-indexing the multi-dimensional representation as a radix $2^3$ decimation architecture;
    simplifying the radix $2^3$ decimation architecture to obtain a nested butterfly architecture;
    acquiring N samples of a finite duration time-sampled signal; and
    inputting the acquired N samples into the nested butterfly architecture to obtain a N-point fast Fourier transform (FFT) output.

2. The method of claim 1 wherein the acquiring step is performed by an analog-to-digital converter.

3. The method of claim 1 wherein the multi-dimensional representation has four dimensions.

4. The method of claim 1 wherein the radix $2^3$ decimation architecture is a decimation in time (DIT) architecture.

5. The method of claim 1 wherein the radix $2^3$ decimation architecture is a decimation in frequency (DIF) architecture.

6. The method of claim 5 wherein the radix $2^3$ decimation architecture is implemented by a first 3 fast Fourier transform (FFT) stages.

7. The method of claim 6 further comprising recursively processing the first 3 fast Fourier transform (FFT) stages.

8. The method of claim 1 wherein the nested butterfly architecture is implemented by a second 3 fast Fourier transform (FFT) stages.

9. The method of claim 8 wherein the nested butterfly architecture comprises an autoscaling shifter to autoscale a third stage of the second 3 fast Fourier transform (FFT) stages.

10. The method of claim 9 wherein the autoscaling shifter is implemented as a $\log_2$ shifter.

11. The method of claim 1 wherein the nested butterfly architecture further comprises at least one buffer memory.

12. The method of claim 11 wherein the at least one buffer memory is implemented as 8 banks on the write side.

13. The method of claim 11 wherein the nested butterfly architecture further comprises a twiddle shift for shifting an output of the at least one buffer memory.

14. The method of claim 13 wherein the twiddle shift is implemented as a quarter sine wave.

15. The method of claim 1 wherein the N samples are weighted by a window before inputting into the nested butterfly architecture.

16. The method of claim 15 wherein the window is one of a Kaiser window, a Hamming window, a Blackman-Tukey window, a Hanning window, a Cosine window, a Lanczos window, a Bartlett window, a Gauss window, a Bessel window or a Nuttal window.

17. A fast Fourier transform (FFT) processor for area and speed efficient FFT processing comprising:
    a processing unit for
        a) mapping a one-dimensional discrete Fourier transform (DFT) to a multi-dimensional representation;
        b) re-indexing the multi-dimensional representation as a radix $2^3$ decimation architecture; and
        c) simplifying the radix $2^3$ decimation architecture;
    an analog-to digital converter for acquiring N samples of a finite duration time-sampled signal; and
    a nested butterfly architecture derived from the simplified radix $2^3$ decimation architecture, the nested butterfly architecture for converting the acquired N samples to a N-point fast Fourier transform (FFT) output.

18. The fast Fourier transform (FFT) processor of claim 17 wherein the N samples are weighted by one of a Kaiser window, a Hamming window, a Blackman-Tukey window, a Hanning window, a Cosine window, a Lanczos window, a Bartlett window, a Gauss window, a Bessel window or a Nuttal window.

19. The fast Fourier transform (FFT) processor of claim 17 wherein the multi-dimensional representation has four dimensions.

20. The fast Fourier transform (FFT) processor of claim 17 wherein the radix $2^3$ decimation architecture is a decimation in time (DIT) architecture.

21. The fast Fourier transform (FFT) processor of claim 17 wherein the radix $2^3$ decimation architecture is a decimation in frequency (DIF) architecture.

22. The fast Fourier transform (FFT) processor of claim 21 wherein the radix $2^3$ decimation architecture is implemented by a first 3 fast Fourier transform (FFT) stages.

23. The fast Fourier transform (FFT) processor of claim 22 wherein the processing unit recursively processes the first 3 fast Fourier transform (FFT) stages.

24. The fast Fourier transform (FFT) processor of claim 17 wherein the nested butterfly architecture is implemented by a second 3 fast Fourier transform (FFT) stages.

25. The fast Fourier transform (FFT) processor of claim 24 wherein the nested butterfly architecture comprises an autoscaling shifter to autoscale a third stage of the second 3 fast Fourier transform (FFT) stages.

26. The fast Fourier transform (FFT) processor of claim 25 wherein the autoscaling shifter is implemented as a $\log_2$ shifter.

27. The fast Fourier transform (FFT) processor of claim 17 wherein the nested butterfly architecture further comprises at least one buffer memory.

28. The fast Fourier transform (FFT) processor of claim 27 wherein the at least one buffer memory is implemented as 8 banks on the write side.

29. The fast Fourier transform (FFT) processor of claim 27 wherein the nested butterfly architecture further comprises a twiddle shift for shifting an output of the at least one buffer memory.

30. The fast Fourier transform (FFT) processor of claim 29 wherein the twiddle shift is implemented as a quarter sine wave.

31. An apparatus for area and speed efficient fast Fourier transform (FFT) processing comprising:
    means for mapping a one-dimensional discrete Fourier transform (DFT) to a multi-dimensional representation;
    means for re-indexing the multi-dimensional representation as a radix $2^3$ decimation architecture;
    means for simplifying the radix $2^3$ decimation architecture to obtain a nested butterfly architecture;

means for acquiring N samples of a finite duration time-sampled signal; and means for inputting the acquired N samples into the nested butterfly architecture to obtain a N-point fast Fourier transform (FFT) output.

32. The apparatus of claim 31 wherein the multi-dimensional representation has four dimensions.

33. The apparatus of claim 31 wherein the radix $2^3$ decimation architecture is a decimation in frequency (DIF) architecture.

34. The apparatus of claim 33 wherein the radix $2^3$ decimation architecture is implemented by a first 3 fast Fourier transform (FFT) stages which are recursively processed.

35. The apparatus of claim 31 wherein the nested butterfly architecture is implemented by a second 3 fast Fourier transform (FFT) stages.

36. The apparatus of claim 35 wherein the nested butterfly architecture comprises an autoscaling shifter to autoscale a third stage of the second 3 fast Fourier transform (FFT) stages.

37. The apparatus of claim 36 wherein the autoscaling shifter is implemented as a $\log_2$ shifter.

38. The apparatus of claim 31 wherein the nested butterfly architecture comprises at least one buffer memory implemented as 8 banks on the write side.

39. The apparatus of claim 38 wherein the nested butterfly architecture further comprises a twiddle shift for shifting an output of the at least one buffer memory.

40. The apparatus of claim 39 wherein the twiddle shift is implemented as a quarter sine wave.

41. The apparatus of claim 31 wherein the N samples are weighted by a window before inputting into the nested butterfly architecture.

42. The apparatus of claim 41 wherein the window is one of a Kaiser window, a Hamming window, a Blackman-Tukey window, a Hanning window, a Cosine window, a Lanczos window, a Bartlett window, a Gauss window, a Bessel window or a Nuttal window.

43. A computer-readable medium having a computer program comprising instructions, which when executed by at least one processor, operates to, the computer program comprising:

instructions for mapping a one-dimensional discrete Fourier transform (DFT) to a multi-dimensional representation;

instructions for re-indexing the multi-dimensional representation as a radix $2^3$ decimation architecture;

instructions for simplifying the radix $2^3$ decimation architecture to obtain a nested butterfly architecture;

instructions for acquiring N samples of a finite duration time-sampled signal; and instructions for inputting the acquired N samples into the nested butterfly architecture to obtain a N-point fast Fourier transform (FFT) output.

44. The computer-readable medium of claim 43 wherein the radix $2^3$ decimation architecture is a decimation in frequency (DIF) architecture implemented by a first 3 fast Fourier transform (FFT) stages.

45. The computer-readable medium of claim 44 further comprising instructions for recursively processing the first 3 fast Fourier transform (FFT) stages.

46. The computer-readable medium of claim 43 wherein the nested butterfly architecture is implemented by a second 3 fast Fourier transform (FFT) stages and comprises an autoscaling shifter to autoscale a third stage of the second 3 fast Fourier transform (FFT) stages.

47. The computer-readable medium of claim 43 wherein the nested butterfly architecture comprises at least one buffer memory implemented as 8 banks on the write side.

48. The computer-readable medium of claim 47 wherein the nested butterfly architecture further comprises a twiddle shift for shifting an output of the at least one buffer memory and wherein the twiddle shift is implemented as a quarter sine wave.

49. The computer-readable medium of claim 43 wherein the N samples are weighted by a window before inputting into the nested butterfly architecture.

50. The computer-readable medium of claim 49 wherein the window is one of a Kaiser window, a Hamming window, a Blackman-Tukey window, a Hanning window, a Cosine window, a Lanczos window, a Bartlett window, a Gauss window, a Bessel window or a Nuttal window.

* * * * *